United States Patent
Frank

(10) Patent No.: US 6,726,269 B1
(45) Date of Patent: Apr. 27, 2004

(54) SINGLE VALVE HYDRAULIC OPERATOR FOR CONVERTIBLE TOP WITH MOVABLE REAR BOW

(75) Inventor: George Joseph Frank, Deerfield, MI (US)

(73) Assignee: Dura Convertible Systems, Inc., Adrian, MI (US)

( * ) Notice: Subject to any disclaimer, the term of this patent is extended or adjusted under 35 U.S.C. 154(b) by 0 days.

(21) Appl. No.: 10/266,465

(22) Filed: Oct. 8, 2002

(51) Int. Cl.[7] .................................................. B60J 7/08
(52) U.S. Cl. .............. 296/117; 296/107.08; 296/107.09
(58) Field of Search .......................... 296/107.01, 117, 296/112, 115, 107.08, 107.09, 107.16, 136.03, 136.04, 136.05

(56) References Cited

U.S. PATENT DOCUMENTS

| | | | | |
|---|---|---|---|---|
| 2,169,340 A | * | 8/1939 | Falcon | |
| 5,067,768 A | * | 11/1991 | Fischbach | |
| 5,279,119 A | * | 1/1994 | Shelhart et al. | |
| 5,620,226 A | | 4/1997 | Sautter, Jr. | ............ 296/107 |
| 6,508,503 B2 | * | 1/2003 | Mentink | |
| 2002/0167194 A1 | * | 11/2002 | Gerhardus Mentink et al. | |

* cited by examiner

Primary Examiner—Dennis H. Pedder
Assistant Examiner—Patricia Engle
(74) Attorney, Agent, or Firm—David A. Greenlee

(57) ABSTRACT

A convertible top operating mechanism includes a bi-directional hydraulic pump which is selectively connected to top-operating hydraulic cylinders and tonneau-operating hydraulic cylinders by a two-way, 5-condition control valve to selectively raise and lower the top and tonneau. A mechanical linkage connects the top-operating cylinders with a movable rear bow and is co-operable with a spring during operation of the top-operating cylinders when fully extending and initially retracting to move the rear bow to enable tonneau operation and to seal the top on the tonneau.

6 Claims, 6 Drawing Sheets

SINGLE VALVE HYDRAULIC OPERATOR FOR CONVERTIBLE TOP WITH MOVABLE REAR BOW

TECHNICAL FIELD

This invention relates to automobile convertible tops and, more particularly, to a hydraulic operator for a convertible top having a movable rear bow.

BACKGROUND OF THE INVENTION

Many convertible tops designed for high-end sports or other two-seat vehicles employ a movable rear or 5-bow. With the top lowered, the tonneau is opened to enable raising the top. The rear bow is then raised to enable closing of the tonneau. The rear bow is then lowered and secured to the tonneau to close the passenger compartment. To lower the top, the rear bow is raised to enable opening of the tonneau. The top is then lowered, after which the tonneau is closed. This system eliminates the need for a separate boot cover and presents a more aesthetically pleasing vehicle in both the top raised and lowered positions.

Power tops that utilize a movable rear bow normally provide a pair of cylinders to operate the top, and require manual operation to raise and lower the rear bow or provide an additional pair of cylinders to operate the rear bow. These top operating systems are unduly complex and require use of complex valving to accomplish the correct sequence of top and bow movements to raise and lower the top.

Developments have led to a hydraulic control system in which a single pair of cylinders can be used to sequentially operate both the top and rear bow movements operating through a mechanical linkage. Such a system is disclosed in U.S. Pat. No. 5,620,226—Sautter, the entire disclosure of which is incorporated herein by reference.

There is a need for a convertible top operating mechanism which uses a simplified hydraulic control system to sequentially operate the top and tonneau movements to raise and lower the top.

SUMMARY OF THE INVENTION

It is therefore an object of this invention to provide a for a convertible top operating mechanism which uses a simplified hydraulic control system to sequentially operate the top and bow movements to raise and lower the top.

In general, this invention comprises a hydraulic control system for operating cylinders that control movement of a hydraulic top and cylinders that control movement of a tonneau.

In one aspect this invention features a convertible top operating mechanism which includes a bi-directional hydraulic pump which is selectively connected to top-operating hydraulic cylinders and tonneau-operating hydraulic cylinders by a two-way, 2-condition control valve to selectively raise and lower the top and tonneau.

In one embodiment, a mechanical linkage connects the top-operating cylinders with the movable rear bow and is operable to sequentially move the rear bow in a manner that accommodates tonneau operation in coordination with top operation.

In a first valve position, both ends of the top cylinders are connected to both sides of the pump, while one end of the tonneau cylinders are connected to one side of the pump, and the other tonneau cylinder ends are blocked. When the pump is inoperative (condition 1), this allows the top to float, but secures the tonneau against movement.

In this first valve position, operation of the pump in one direction will extend the top cylinders only (condition 2) to raise the top; it will pressurize one side of the tonneau cylinders, but they cannot move since the exhaust side is blocked. Pump operation in the other direction will retract the top cylinders only (condition 3) to lower the top; the tonneau cylinders are connected to exhaust, but cannot move since the pressure side is blocked.

In a second valve position, both ends of the tonneau cylinders are connected to both sides of the pump, while one end of the top cylinders are connected to one side of the pump and the other top cylinder ends are blocked. If this position were used when the pump is inoperative, the tonneau would be unpressured and float, while the top would be secured against movement; however this condition is not desired and, consequently not utilized.

In this second valve position, pump operation in one direction will extend the tonneau cylinders only (condition 4) to raise the tonneau. Operation of the pump in the other direction will retract the tonneau cylinders only (condition 5) to lower the tonneau. In both conditions 4 and 5, the blockage of one end of the top cylinders prevents their movement.

These and other objects and features of this invention will become more readily apparent upon reference to the following detailed description of a preferred embodiment, as illustrated in the accompanying drawings, in which:

DESCRIPTION OF THE PREFERRED EMBODIMENT

Figure 1:
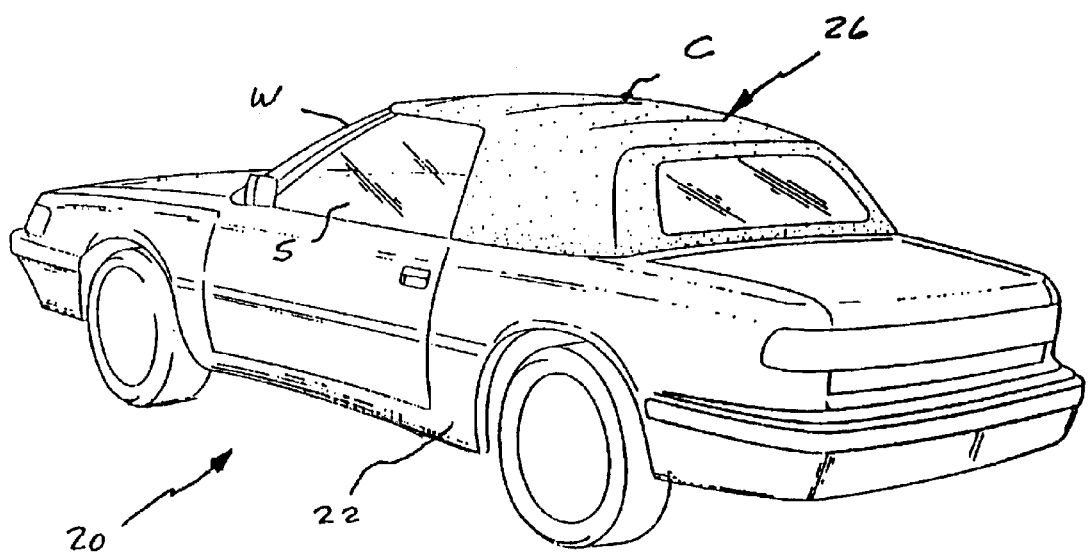
FIGS. 1 and 2 are perspective views of a convertible vehicle with its top shown in raised and lowered positions, respectively.
Figure 2:
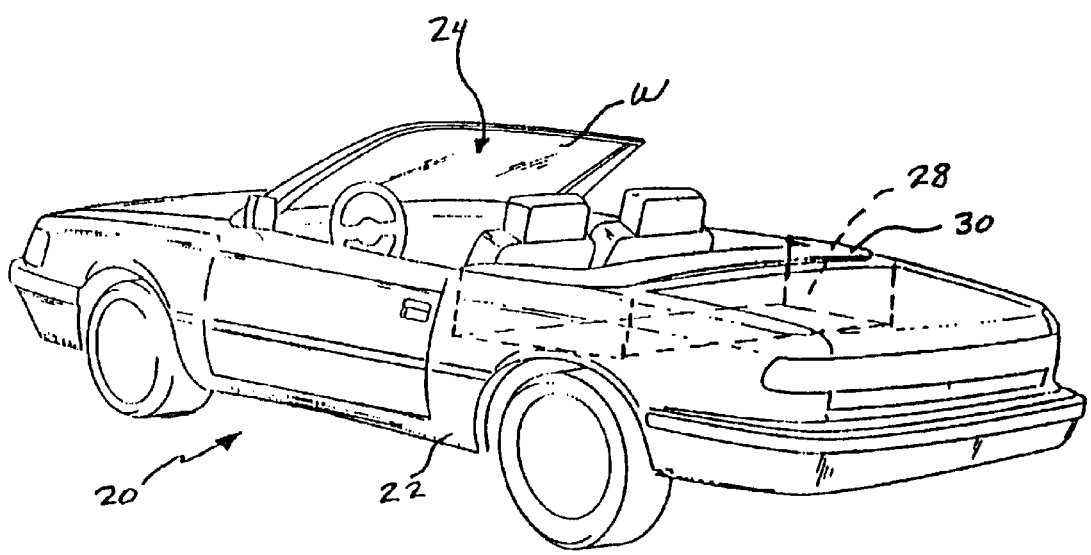
Figure 3:
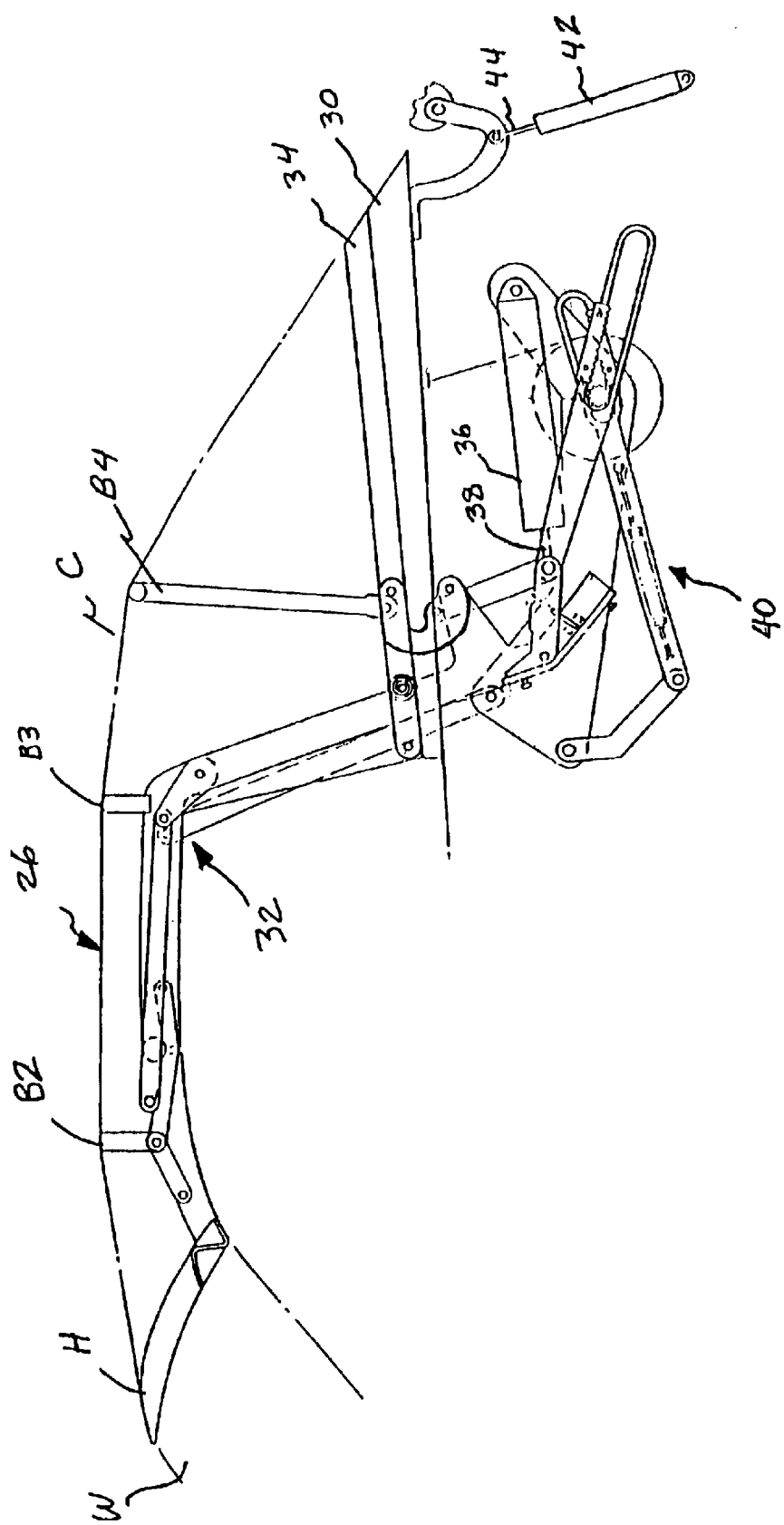
FIG. 3 is a side view of one form of convertible top, having a movable rear bow, and illustrating the linkages and hydraulic cylinders used to control sequential movement of the top and the movable tonneau.

This invention is directed to a top and tonneau operating system for the convertible top of a vehicle, such as the one disclosed in aforementioned U.S. Pat. No. 5,620,226. As shown in FIGS. 1–3 a convertible vehicle 20 includes a body 22 having a passenger compartment 24 that is enclosed by a windshield W, side windows S and a retractable top 26 that is selectively lowered into a storage compartment 28 behind passenger compartment 24. A tonneau 30 covers storage compartment 28 when top 26 is lowered, and is selectively opened and closed, as later described, to permit raising and lowering of top 26.

As shown in FIG. 3, top 26 comprises a flexible cover C supported by a header H and transverse bows B2, B3 and B4. The bows are supported at their sides by symmetrical articulated linkages 32 that pivotally support a movable rear, or #5, bow 34. In the illustrated raised position of FIGS. 1 and 3, rear bow 34 rests upon and seals against tonneau 30. Top 26 is raised and lowered by a pair of hydraulic cylinders 36, 36', which have extensible output cylinder rods 38, 38' that operate linkages 32 via a mechanical linkage 40 that also raises and lowers rear bow 34.

Tonneau 30 is opened and closed by a pair of hydraulic cylinders 42, 42' that have extensible output cylinder rods 44, 44'. For the sake of simplicity, FIG. 3 illustrates only one side of the top and its operating system, since both sides are symmetrical. The top structure and operating system are more fully described in aforementioned U.S. Pat. No. 5,620, 226.

Referring now to the schematics in FIGS. 4–7, top-operating hydraulic cylinders 36, 36' have respective cylinder rods 38, 38' that extend and retract to operate articulated linkages 32 to raise and lower top 26 and rear bow 34 via mechanical linkage 40. Tonneau-operating hydraulic cylinders 42, 42' each has a cylinder rod 44, 44' that extend and retract to raise and lower tonneau 30. Cylinders 36, 36', 40, 40' are all supplied with hydraulic power fluid from a power pack 50 that includes the usual reservoir of hydraulic fluid (not shown) that supplies a bi-directional pump 52 driven by an electric motor M.

Pump 52 has one side connected to a fluid transfer line 54 which connects to a control unit 56 that includes a 2-position, 2-way valve 58, that is operated by a solenoid 60 under direction of a controller C. Fluid in line 54 flows through a pilot-operated check valve 62 that is opened by pressure in a line 64 that connects to another fluid transfer line 66 connected to the other side of pump 52.

Figure 4:
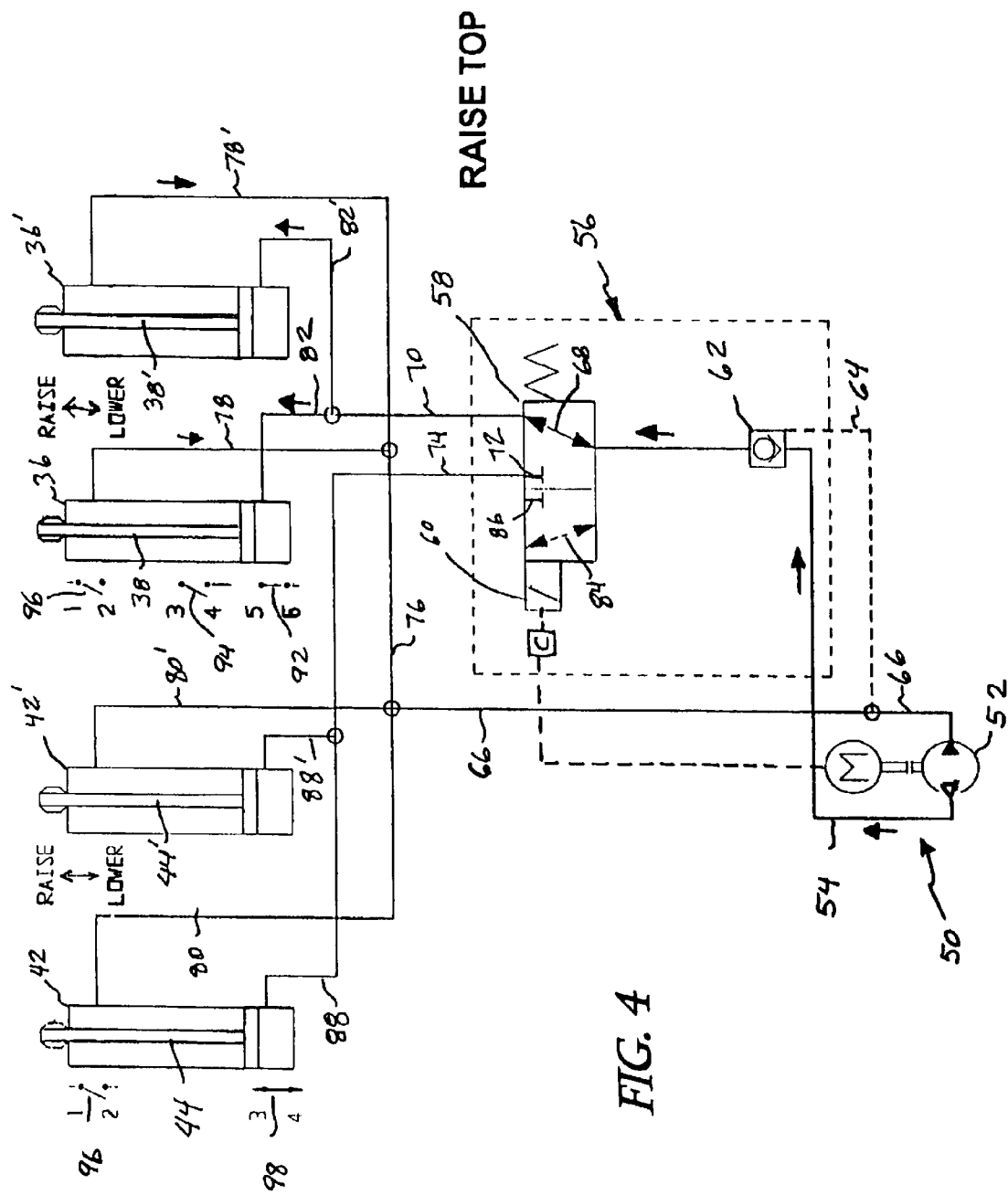
FIG. 4 is a hydraulic schematic of the hydraulic cylinder control system, with the pump direction and control valve positioned to extend the top hydraulic cylinders and raise the top.
Figure 5:
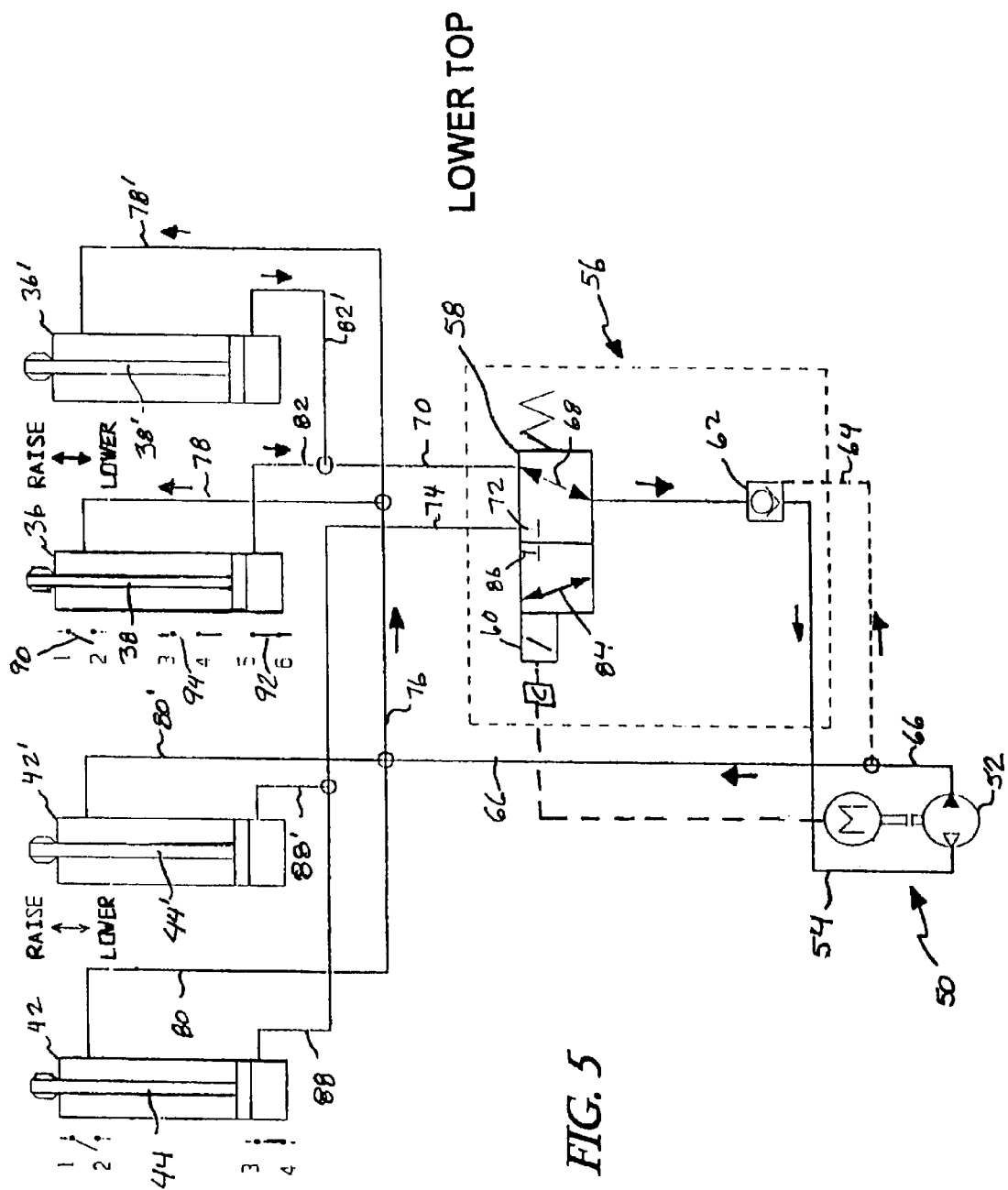
FIG. 5 is a schematic similar to FIG. 4, is a hydraulic schematic of the hydraulic cylinder control system, with the pump direction and control valve positioned to retract the top hydraulic cylinders and lower the top.

The right side of valve 58 includes a transfer bore 68 that connects to fluid line 70, and a blocked port 72 that connects to fluid line 74 when valve 58 is in the FIGS. 4 and 5 positions. Pump line 66 connects to a distribution fluid line 76 for lines 78, 78' that connect to the rod ends of top cylinders 36, 36'. Lines 80, 80' connect the rod ends of tonneau cylinders 42, 42' to distribution line 76. With this arrangement, pump line 66 is always connected to the rod ends of all of cylinders 36, 36' and 42, 42'. There is a fluid connection through check valve 62 and valve 58, via line 70 and lines 82, 82', between pump 52 and cylinder 36, 36'. Fluid in the blind ends of tonneau cylinders 42, 42' through fluid lines 88, 88' is trapped by port 72.

Figure 6:
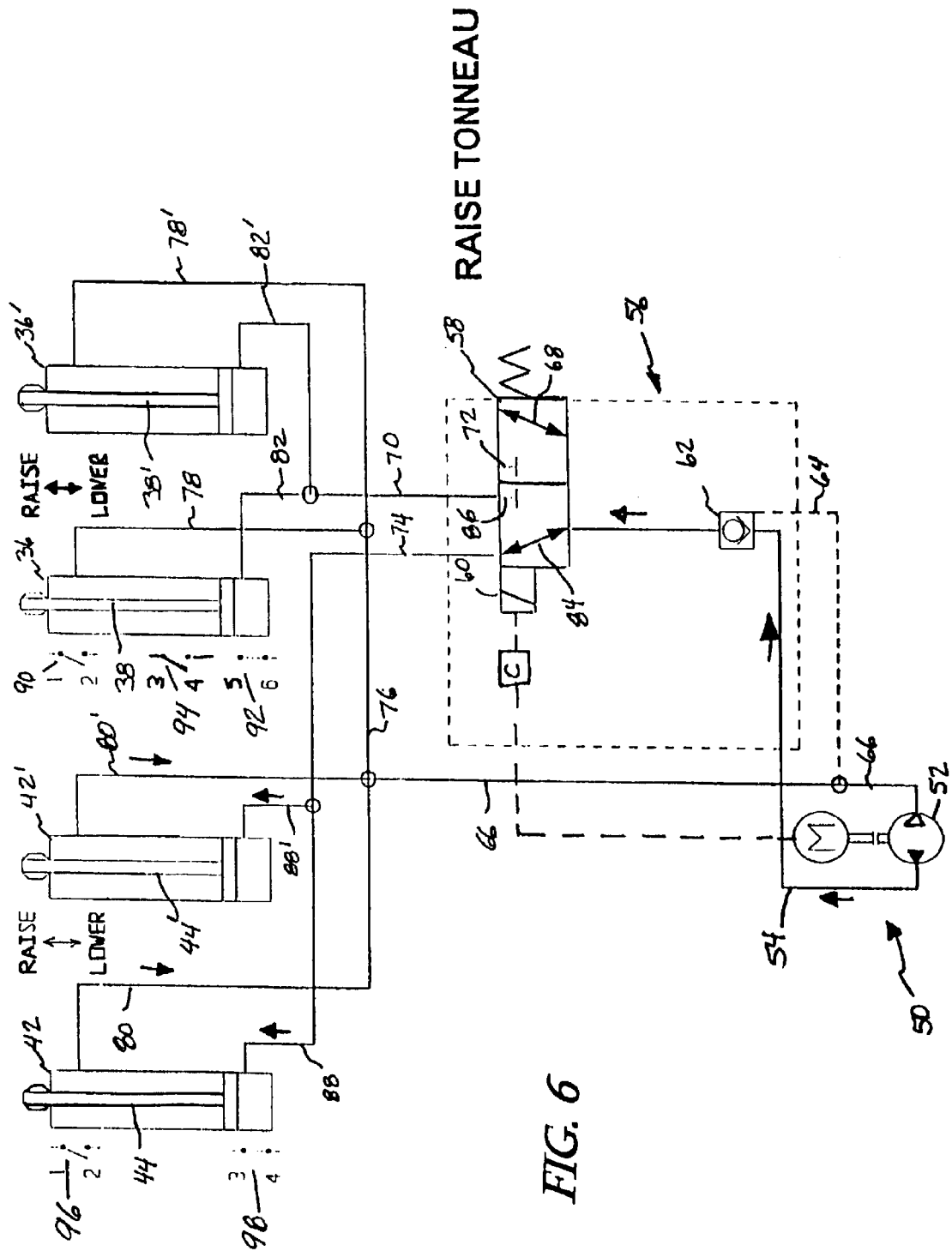
FIG. 6 is a schematic similar to FIGS. 4 and 5, but with the pump direction and control valve positioned to extend the tonneau hydraulic cylinders and raise the tonneau.
Figure 7:
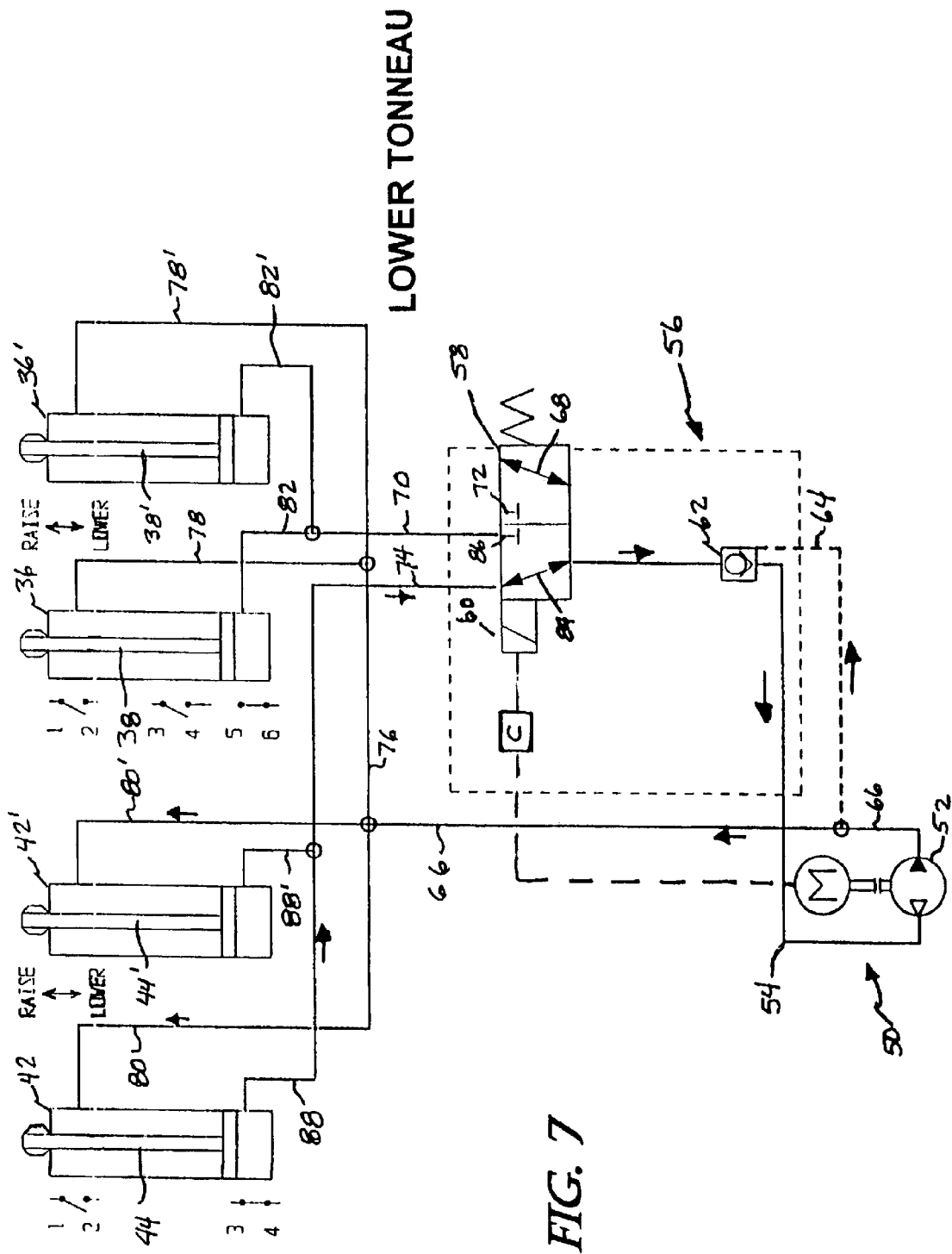
FIG. 7 is a schematic similar to FIG. 6, but with the pump direction and control valve positioned to retract the tonneau hydraulic cylinders and lower the tonneau.

The left side of valve 58 includes a transfer bore 84 that connects to fluid line 74, and a blocked port 86 that connects to fluid line 70 when valve 58 is in the FIGS. 6 and 7 positions. Line 74 connects through lines 88 and 88' to the blind ends of tonneau cylinders 42, 42', while the blind ends of top cylinders 36, 36' are connected through lines 82, 82' and line 70 to blocked port 86. Again, with this arrangement, pump line 66 is always connected to the rod ends of all of cylinders 36, 36' and 42, 42'. There is a fluid connection through check valve 62 and valve 58 between pump 52 and cylinder 42, 42' blind ends via lines 74, 88, 88', while fluid in the blind ends of cylinders 36, 36' is trapped by port 86.

Top cylinder 36 is provided with extreme position limit switches 90 and 92 and intermediate limit switch 94 to monitor the position of the top cylinders. Tonneau cylinder 42 is provided with extreme limit switches 96 and 98 to monitor its position. These limit switches enable controller C to sequence operation of the hydraulic cylinders to open and close the tonneau and to raise and lower the top with appropriate raising and lowering of the rear bow in proper sequence. Intermediate limit switch 92 is necessitated by the use of the mechanical linkage 40 to control operation of the top cylinders to raise and lower rear bow 34 during top movement between raised and lowered positions, as more fully described in aforementioned U.S. Pat. No. 5,620,226.

FIG. 4 depicts the position of valve 58 and direction of pump 52 to raise the top from its lowered and stored position. FIG. 5 depicts the position of valve 58 and condition of pump 52 to lower the top. FIG. 6 depicts the position of valve 58 and direction of pump 52 to raise the tonneau. FIG. 7 depicts the position of valve 58 and condition of pump 52 to lower the tonneau. Operation of the hydraulic system under conditions depicted in these drawing figures will now be described.

In FIG. 4, pump 52 is in condition to supply pressure fluid to the system through line 54 and receive exhausted fluid through line 66 to raise top 26. Of course makeup and excess fluid are transitioned through the sump or reservoir (not illustrated), as is usual. When commanded by controller C, pressure fluid is delivered through line 54, check valve 62, control valve 58, bore 58, line 70 and lines 82, 82' to extend top cylinders rods 38, 38'. This forces fluid in the rod ends of cylinders 36, 36' to exhaust through lines 78, 78', 76 and 66 directly to pump 52. Tonneau cylinder rods 44, 44' are held in position by the fluid trapped in the cylinder blind ends which are connected via lines 88, 88' and 74 to blocked port 74. Only low exhaust pressure from top cylinders 36, 36' is sensed by the rod ends of cylinders 42, 42' via lines 80, 80'. As cylinder rods 38, 38' extend, top 26 rises out of storage compartment 28.

In FIG. 5, pump 52 is reversed to supply pressure fluid to the system through line 66 and to receive exhaust fluid through line 54 via valves 58 and 62 to lower top 26. Controller C commands delivery of pressure fluid to line 66. This causes pressurization of pilot line 64 to open check valve 62. Pressure fluid flows through line 76 to the rod ends of top cylinders 36, 36' via lines 78, 78', and to the rod ends of tonneau cylinders 42, 42' via lines 80, 80'. The blind ends of top cylinders 36, 36' connect back to pump 52 via lines 82, 82' and 70, valve bore 68 and check valve 62 (held open by pilot pressure) and line 54. Fluid is trapped in the blind ends of cylinders 42, 42' since outflow through lines 88, 88' is blocked by blocked port 72. Thus, tonneau cylinders 42, 42' are prevented from retracting to close tonneau 30, despite pressure in their rod ends. As cylinder rods 38, 38' retract, top 26 lowers into storage compartment 28.

In FIG. 6, pump 52 is again reversed to pressurize line 54, while solenoid 60 is commanded to shift valve 58 rightward to flow fluid through check valve 62, valve bore 84, and lines 74, 88 and 88' to the blind ends of tonneau cylinders 42, 42' to extend cylinder rods 44, 44' and raise tonneau 30. Outflow from the tonneau cylinder rod ends is through lines 80, 80' and 66 to pump 52. Top cylinders 36, 36' are locked against movement by blockage of any outflow of fluid from their blind ends, because lines 82, 82' connect to blocked port 86 in valve 58, and fluid in their rod ends are subject to exhaust pressure in lines 76, 78 and 78'. As cylinder rods 44, 44' extend, tonneau 30 rises to permit passage of top 26 between raised and lowered positions.

In FIG. 7, pump 52 is again reversed to pressurize line 66, and pressurize pilot line 64 to open check valve 62. Pressure fluid flows through lines 66, 76, 80 and 80' to the rod ends of cylinders 42, 42' to retract cylinder rods 44, 44'. Fluid outflow from the blind ends of the tonneau cylinders is through lines 88, 88' and 74, through valve bore 84 and now-open check valve 62 and line 54 to pump 52. Top cylinders 36, 36' are immobilized by trapped fluid in their blind ends, which connect through lines 82, 82' to blocked valve port 86, even though the rod ends are pressurized via lines 76, 78 and 78'. Retracting cylinder rods 44, 44' lower tonneau 30 to close storage compartment 28.

Operation of the top operating hydraulic control system will now be described during the raise/lower cycle of the convertible top through sequential movement of the top and tonneau cylinders, beginning with the top in lowered position within storage compartment 28 with tonneau 30 closed (FIG. 2).

The hydraulics will initially be in the FIG. 6 position. Pump 52 is commanded to pressurize line cylinders 42, 42' through line 54, valves 62 and 58 and lines 74, 88 and 88' to extend cylinder rods 44, 44' and raise tonneau 30.

Next, valve 58 is shifted and the hydraulics are in the FIG. 4 position, with the blind ends of top cylinders 36, 36' pressurized via line 54, valves 62 and 58 and lines 70, 82 and 82' to extend cylinder rods 38, 38' to initially raise top 26 and then to raise rear bow 34, as more fully detailed in aforementioned U.S. Pat. No. 5,620,226.

The hydraulics then assume the FIG. 7 position via reversal of pump 52, which now pressurizes the tonneau cylinder rod ends via lines 66, 80 and 80' to retract rods 44, 44' and lower tonneau 30. The hydraulics are then shifted to the FIG. 5 position by shifting valve 58. This pressurizes the rod ends of top cylinders 36, 36' via lines 66, 76, 78 and 78' to partially retract cylinder rods 38, 38' to lower rear bow 30 is lowered as sensed by limit switch 94 which causes controller C to stop pump 52.

When it is desired to lower the top, pump 52 is reversed to the FIG. 4 position to fully extend cylinder rods 38, 38' and again raise rear bow 30. Then valve 58 is shifted to the FIG. 6 position and tonneau 30 is raised. Next, pump 52 is reversed and valve 58 is shifted to the FIG. 5 position and top 26 is lowered. Then valve 58 is shifted to the FIG. 7 position to lower tonneau 30. Top 26 is raised by reversing the above procedure.

While only a preferred embodiment has been described and shown, obvious modifications are contemplated within the scope of this invention and the following claims.

I claim:

1. A top operating mechanism for moving a vehicle convertible top between a lowered position stored in a storage well and a raised position, said storage well having a tonneau movable between open and closed positions, said top comprising a pair of spaced linkages each comprising a plurality of pivotally-interconnected side rails including a rear rail, a plurality of spaced transverse bows, including a rear bow pivotally attached to the rear rails for independent raising and lowering movement relative to the rear rail to enable movement of the tonneau, interconnecting the linkages to support a fabric top, and a power operator connected to each rear rail that is extensible to raise the top and retractable to lower the top, said top operating mechanism characterized by a first hydraulic cylinder for raising and lowering the top, a second hydraulic cylinder for raising and lowering the tonneau, a hydraulic power source including a reversible pump, a 2-position, solenoid-operated control valve, a fluid distribution system interconnecting the source, cylinders and valve, including first fluid lines connecting the source with a first end of the top and tonneau cylinders and second fluid lines connecting the valve with the other ends of the top and tonneau cylinders, and third fluid lines including a pilot operated check valve connecting the source to the control valve, and a controller for operating the reversible pump and control valve to selectively extend and retract each of the cylinders to raise and lower the top and raise and lower the tonneau.

2. The top operating mechanism of claim 1, wherein the power operators are hydraulic cylinders and further characterized by a 2-way, 2-position control valve, which selectively connects a bi-directional hydraulic pump with the top-operating hydraulic cylinders.

3. The top operating mechanism of claim 2, including a pair of tonneau-operating hydraulic cylinders, and further characterized by the control valve selectively connecting the hydraulic pump with the tonneau-operating hydraulic cylinders.

4. A top operating mechanism for moving a vehicle convertible top between a lowered position stored in a storage well and a raised position, said storage well having a tonneau movable between open and closed positions, said top comprising a pair of spaced linkages each comprising a plurality of pivotally-interconnected side rails including a rear rail, a plurality of spaced transverse bows, including a rear bow pivotally attached to the rear rails for independent raising and lowering movement relative to the rear rail to enable movement of the tonneau, interconnecting the linkages to support a fabric top, a pair of tonneau-operating hydraulic cylinders to raise and lower the tonneau, and a top-operating hydraulic cylinder connected to each rear rail that is operable to raise the top and lower the top, said top operating mechanism characterized by a mechanical linkage connecting each power operator with the rear bow for raising the rear bow when the hydraulic cylinder is moved to fully extended condition, and for lowering the rear bow when the hydraulic cylinder is initially retracted from its fully extended condition, and a 2-way, 2-position control valve, which selectively connects a bi-directional hydraulic pump with the top-operating and tonneau-operating hydraulic cylinders, and a controller for operating the valve and pump to sequentially operate the cylinders to raise the tonneau, raise the top, and lower the tonneau. thereby raising the top, and to raise the tonneau, lower the top, and lower the tonneau, thereby lowering the top.

5. The top operating mechanism of claim 4, wherein the top-operating and tonneau-operating hydraulic cylinders, the bi-directional pump, and the control valve comprising a hydraulic system, and further characterized by the hydraulic system having a first neutral condition, a second condition for raising the top, a third condition for lowering the top, a fourth condition for opening the tonneau, and a fifth condition for lowering the tonneau.

6. The top operating mechanism of claim 5, further characterized by the top-operating cylinders being extended during the second condition and being retracted during the third condition, and by the mechanical linkage being activated at the end of the second condition to lower the rear bow and being activated at the beginning of the third condition for raising the rear bow.

* * * * *